United States Patent Office 2,794,306
Patented June 4, 1957

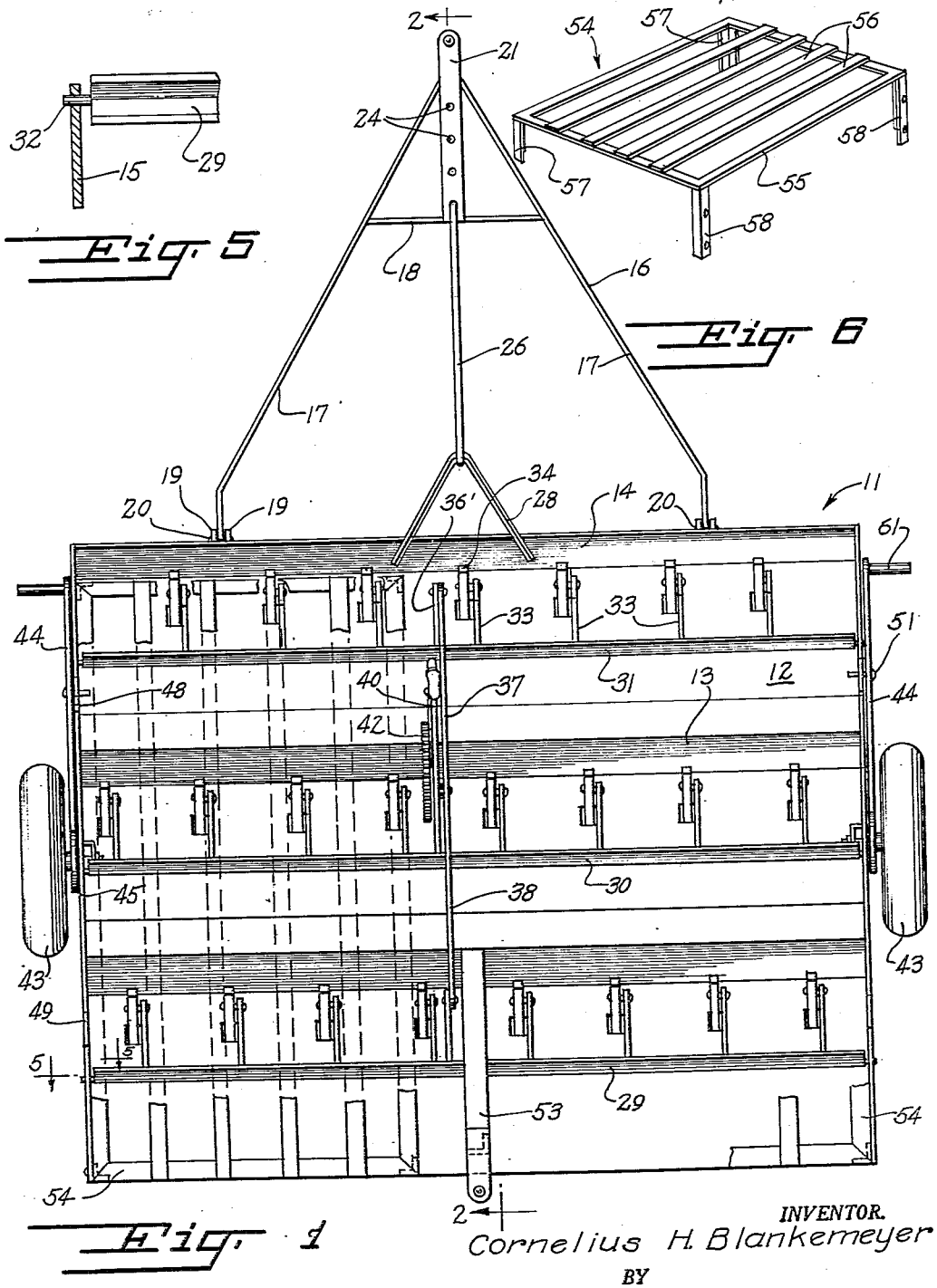

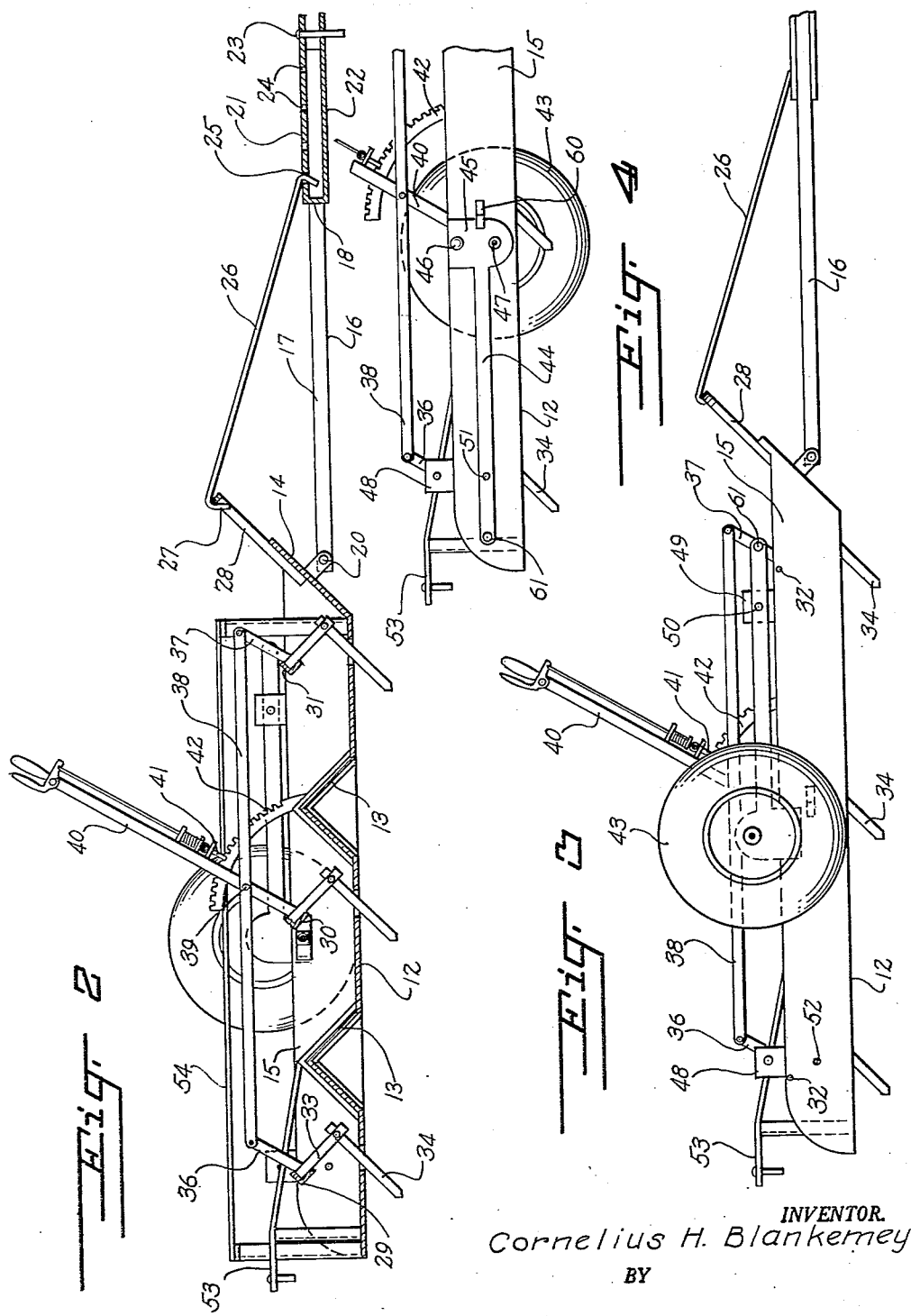

2,794,306

ADJUSTABLE HARROW

Cornelius H. Blankemeyer, Columbus Grove, Ohio

Application March 18, 1955, Serial No. 495,133

2 Claims. (Cl. 55—23)

This invention relates to farm implements, and more particularly to an improved adjustable harrow or drag adapted to be drawn over the ground to prepare the ground for planting.

A main object of the invention is to provide a novel and improved adjustable harrow device adapted to be connected to a farm tractor or similar tractor means and which is adapted to cultivate the ground to prepare the ground for planting, said device being simple in construction, being readily adjustable in accordance with the depth of penetration of the ground required, and being easy to transport from place to place.

A further object of the invention is to provide an improved adjustable harrow device which is inexpensive to fabricate, which is durable in construction, and which is easy to adjust to provide a desired depth of penetration of the ground-engaging tooth elements thereof, as well as to provide a desired elevation of the device above the ground, including complete elevation of the spike or tooth elements of the device above the ground so that the device may be readily transported from place to place when required.

Further objects and advantages of the invention will become apparent from the following description and claims, and from the accompanying drawings, wherein:

Figure 1 is a top plan view, with parts broken away, of an improved adjustable harrow device constructed in accordance with the present invention.

Figure 2 is a longitudinal vertical cross sectional view taken on the line 2—2 of Figure 1.

Figure 3 is a side elevational view of the harrow device of Figure 1.

Figure 4 is a fragmentary side elevational view of the harrow device of Figures 1, 2 and 3, showing the supporting wheels of the device in lowered positions, whereby the tooth or spike elements of the device are elevated completely above the ground.

Figure 5 is an enlarged cross sectional detail view taken on the line 5—5 of Figure 1.

Figure 6 is a perspective view, to a reduced scale, of one of the weight supporting platform elements employed on the harrow device of Figures 1 to 5.

Referring to the drawings, the adjustable harrow is designated generally at 11 and comprises a generally rectangular plate-like main body 12 formed with spaced transverse downwardly facing channels 13 which may be of triangular cross sectional shape, as shown in Figure 2. The main body 12 is provided at its front margin with an upwardly and forwardly inclined front wall 14, and said main body 12 is provided with the vertical upstanding side walls 15, 15 merging with the forwardly and upwardly inclined front wall 14.

Designated generally at 16 is a forwardly convergent triangular hitch frame comprising the converging side arms 17, 17 connected by a transverse arm 18, the ends of the side arms 17, 17 being pivotally connected to the front wall 14, as by being received between pairs of pivot lugs 19, 19 secured to said front wall through which extend transverse pivot pins 20.

Secured on the forward end of the frame 16 and respectively overlying and underlying the edges of transverse arm 18 and the converging portions of the side arms 17, 17 are the respective longitudinal flat bar members 21 and 22 which project forwardly from the converging ends of the arms 17, 17, as shown in Figure 2 and which are formed with vertically registering apertures to receive a hitch pin 23. The top bar 21 is formed with longitudinally spaced apertures 24, and engaged in a selected aperture 24 is the hook-like end 25 of a tie rod 26, said tie rod being provided at its opposite end with a hook formation 27 engageable in the end portion of a triangular rigid loop-like bar 28 rigidly secured to the intermediate portion of the front wall 14. Thus, by employing the tie bar 26, counterclockwise rotation of the main body 12 with respect to the hitch frame 16, as viewed in Figure 2, may be limited, whereas, free rotation of the body 12 with respect to frame 16 may be allowed by disconnecting the tie bar 26. As will be readily understood, the hitch pin 23 may be employed to secure the drawbar or other corresponding hitch element of the tractor, or other tractor means, between the forward ends of the bar members 21 and 22.

Designated respectively at 29, 30 and 31 are transversely extending angle bars provided at their ends with outwardly projecting longitudinal stud elements 32 which are rotatably received in apertures provided therefor in the upper portions of the side walls 15, as shown in Figure 5. The angle bars 29, 30 and 31 are spaced apart longitudinally by equal distances and are located on opposite sides of the downwardly facing transverse channels 13, as shown in Figure 2.

Rigidly secured to the bottom flanges of the transverse angle bars 29, 30 and 31 are the transversely spaced, downwardly and forwardly directed arms 33, and pivotally secured to the ends of the respective arms 33 are the downwardly and rearwardly extending spike elements 34, said spike elements passing through respective apertures 35 provided in the flat portions of the main body 12, as is clearly shown in Figure 2.

Since the spike elements 34 are pivotally connected to the respective arms 33, said spike elements will adjust themselves in accordance with the adjusted angular positions of the arms 33.

Secured to the intermediate portions of the angle bars 29 and 31 are the upwardly extending parallel arms 36 and 37 which are connected at their top ends by the longitudinal link bar 38. Rigidly connected to the intermediate angle bar 30 and extending upwardly parallel to the arms 36 and 37 is a lever 40 which is pivotally connected at 39 to the intermediate portion of the link bar 38.

The lever 40 is provided with a conventional locking pin 41 which is lockingly engageable with a notched sector plate 42 rigidly secured on the main body 12, for example, rigidly secured to the top portion of the forward downwardly facing channel element 13, as shown in Figure 2.

As will be readily apparent, the degree of extension of the spike elements 34 may be readily adjusted by adjusting the position of the lever 40, since rotation of lever 40 causes simultaneous rotation of the angle bars 29, 30 and 31 and of their arms 33 and spikes 34.

Designated at 43, 43 are respective supporting wheels journaled to respective bracket arms 44 at the enlarged end portions 45 of said bracket arms. The portions 45 are pivotally secured to the side walls 15 at 46, as shown in Figure 4, the pivotal connections 46 being spaced from the journal connections 47 of the supporting wheels 43, as shown.

Secured to the top marginal portions of each wall 15 on opposite sides of the journal connections 47 are respective upstanding apertured lugs 48 and 49 which are respectively at times registrable with apertures 50 in the arms 44, whereby the arms 44 may be secured in position such as that shown in Figure 3, wherein the main body 12 is completely lowered into engagement with the ground and the wheels 43 are elevated, or in a position wherein the wheels 43 are partially lowered so that the spike elements 34 only partially engage the ground. Thus, fastening pins 51 may be employed to secure the arms 44 in either of the aforesaid positions, the first of which is illustrated in Figure 3. The wheels 43 may be completely lowered to elevate the spikes 34 completely off the ground by securing the arms 44 in the rearwardly extending longitudinal positions thereof illustrated in Figure 4 by means of locking pins 51 extending through the apertures in the ends of the arms 44 and in registering apertures 52 provided in the side walls 15, 15. The pins 51 may be placed in either the apertures in brackets 48 or 49, or in the apertures 52, to correspondingly position the arms 44 and the wheels 43.

Secured to the rear portion of the main body 12 and projecting rearwardly therefrom in the median longitudinal vertical plane thereof is the rearwardly extending hitch bar 53 which may be employed for connecting auxiliary implements to the rear end of the harrow device. Secured on the device on opposite sides of the lever 40 are respective, generally rectangular weight-supporting frames 54, 54, one of which is shown in perspective view in Figure 6. Each frame 54 comprises a rectangular main portion 55 having the longitudinal, spaced parallel weight-supporting strips 56 secured thereon, the main portion 55 being provided at its outside corners with depending vertical angle bars 57 and at its inside corners with similar depending vertical angle bars 58. The angle bars 57 are secured to the respective side walls 15 and the angle bars 58 are supported on the flat portions of main body 12, whereby the frames 54 are securely held on main body 12 and may receive weights to provide a desired depth of penetration of the spikes 34 in the ground, depending upon furrow conditions and the like.

It will be readily apparent that the degree of extension of the spikes 34 may be adjusted by means of lever 40, as above described. Furthermore, the elevation of main body 12 may be adjusted in the manner above described by fastening the arms 44 either to the apertured lugs 48 or to the apertured lugs 49. When it is desired to transport the device from one location to another, the main body 12 may be completely elevated to lift the spikes 34 completely out of engagement with the ground by fastening the arms 44 in the positions thereof shown in Figure 4. Respective stop lugs 60 are provided on the walls 15 to limit counterclockwise rotation of the arms 44, as viewed in Figure 4, to the positions of arms 44 shown therein, namely, to the positions wherein the fastening pins 51 may be engaged through the apertures in the ends of arms 44 and may be engaged in the apertures 52 in the side walls 15 intended to receive said fastening pins 51.

As shown in Figures 1, 3 and 4, suitable laterally and outwardly extending handle elements 61 are provided on the ends of the arms 44 to facilitate the manual rotation of said arms whenever it is necessary to adjust the height of main body 12.

While a specific embodiment of an improved adjustable harrow device has been disclosed in the foregoing description, it will be understood that various modifications within the spirit of the invention may occur to those skilled in the art. Therefore, it is intended that no limitation be placed on the invention except as defined by the scope of the appended claims.

What is claimed is:

1. An adjustable harrow device comprising a plate-like horizontal main body formed with a plurality of spaced transverse downwardly facing channels, said channels being spaced apart longitudinally by substantial distances so as to define transversely extending horizontal surfaces of substantial area adjacent thereto, said main body having upstanding side walls, spaced transverse bars journaled in said side walls and extending across said main body, said transverse bars being longitudinally spaced from said channels and overlying said transversely extending horizontal surfaces, a plurality of depending spikes secured to each of said transverse bars and extending through said transversely extending horizontal surfaces for engagement with the ground therebeneath, parallel upstanding arms on said transverse bars, means connecting the arms on the respective transverse bars for simultaneous rotary movement, means releasably securing said arms in adjusted angular positions, whereby said spikes project adjusted distances below said transversely extending horizontal surfaces, and hitch means on the end of said main body for connecting said main body to a tractor means.

2. An adjustable harrow device comprising a plate-like horizontal main body formed with a plurality of spaced transverse downwardly facing channels, said channels being spaced apart longitudinally by substantial distances so as to define transversely extending horizontal surfaces of substantial area adjacent thereto, said main body having upstanding side walls, spaced transverse bars journaled in said side walls and extending across said main body, said transverse bars being longitudinally spaced from said channels and overlying said transversely extending horizontal surfaces, a plurality of depending parallel arms secured to each of said transverse bars, respective depending spikes pivotally secured to said depending arms and extending through said transversely extending horizontal surfaces for engagement with the ground therebeneath, parallel upstanding arms on said transverse bars, means connecting the arms on the respective transverse bars for simultaneous rotary movement, means releasably securing said arms in adjusted angular positions, whereby said spikes project adjusted distances below said transversely extending horizontal surfaces, and hitch means on the end of said main body for connecting said main body to a tractor means.

References Cited in the file of this patent
UNITED STATES PATENTS

| | | |
|---|---|---|
| 305,923 | Hering et al. | Sept. 30, 1884 |
| 1,260,279 | Faudel | Mar. 19, 1918 |
| 1,418,164 | Piper | May 30, 1922 |